(12) United States Patent
Kitaji

(10) Patent No.: US 8,995,290 B2
(45) Date of Patent: Mar. 31, 2015

(54) COMMUNICATION SYSTEM, RADIO COMMUNICATION DEVICE, AND RADIO COMMUNICATION METHOD

(75) Inventor: Mitsuhiro Kitaji, Yokohama (JP)

(73) Assignee: Kyocera Corporation, Kyoto (JP)

( * ) Notice: Subject to any disclaimer, the term of this patent is extended or adjusted under 35 U.S.C. 154(b) by 897 days.

(21) Appl. No.: 12/597,465

(22) PCT Filed: Apr. 25, 2008

(86) PCT No.: PCT/JP2008/058049
§ 371 (c)(1),
(2), (4) Date: Feb. 18, 2010

(87) PCT Pub. No.: WO2008/139887
PCT Pub. Date: Nov. 20, 2008

(65) Prior Publication Data
US 2010/0150011 A1    Jun. 17, 2010

(30) Foreign Application Priority Data

Apr. 26, 2007  (JP) .................................. 2007-117784

(51) Int. Cl.
*H04W 36/20*    (2009.01)
*H04W 36/30*    (2009.01)

(52) U.S. Cl.
CPC ..................................... *H04W 36/30* (2013.01)
USPC ............ 370/252; 370/310; 370/332; 455/436

(58) Field of Classification Search
USPC ......... 370/331–333, 328, 338, 252, 352, 389, 370/310; 455/436–442, 434, 444, 452.1
See application file for complete search history.

(56) References Cited

U.S. PATENT DOCUMENTS 5,574,775 A * 11/1996 Miller et al. .................. 455/444
6,212,389 B1 * 4/2001 Fapojuwo ..................... 455/453

(Continued)

FOREIGN PATENT DOCUMENTS

EP    1 575 320    9/2005
JP    10-056667    2/1998

(Continued)

OTHER PUBLICATIONS

Decision of Refusal (English translation) for JP 2007-117784, mailed Jan. 17, 2012, 4 pages.

(Continued)

*Primary Examiner* — Vincelas Louis
(74) *Attorney, Agent, or Firm* — Duane Morris LLP

(57) ABSTRACT

A radio terminal 100 includes: a radio condition information acquisition unit 105 configured to acquire radio condition information indicating a condition of a radio signal which is transmitted to or received from the radio base station; an EVDO communication unit 101 and a WLAN communication unit 103 configured to receive a communication quality deterioration notification indicating that a communication quality of a application is deteriorated in a communication target device; a storage unit 111 configured to store a handover threshold in association with the application, the handover threshold based on the radio condition information at the time point when the communication quality deterioration notification is received; and a handover controller 107 configured to execute a handover to another radio base station on the basis of the radio condition information and of the handover threshold.

8 Claims, 6 Drawing Sheets

(56) References Cited

U.S. PATENT DOCUMENTS

| | | | |
|---|---|---|---|
| 2004/0114553 A1* | 6/2004 | Jiang et al. | 370/328 |
| 2004/0147264 A1* | 7/2004 | Ogawa | 455/441 |
| 2005/0070293 A1* | 3/2005 | Tsukiji et al. | 455/452.1 |
| 2005/0221828 A1* | 10/2005 | Wakuta et al. | 455/437 |
| 2005/0266851 A1* | 12/2005 | Kouno | 455/436 |
| 2006/0209821 A1* | 9/2006 | Jung et al. | 370/389 |
| 2006/0245408 A1* | 11/2006 | Lee et al. | 370/338 |
| 2006/0268756 A1* | 11/2006 | Wang et al. | 370/310 |
| 2006/0291415 A1* | 12/2006 | Xu | 370/331 |
| 2007/0173283 A1* | 7/2007 | Livet et al. | 455/552.1 |
| 2007/0184835 A1* | 8/2007 | Bitran et al. | 455/434 |
| 2007/0259666 A1* | 11/2007 | Ohtani et al. | 455/436 |
| 2008/0004020 A1* | 1/2008 | Yasuda | 455/436 |
| 2008/0014941 A1* | 1/2008 | Catovic et al. | 455/436 |
| 2008/0080480 A1* | 4/2008 | Buckley et al. | 370/352 |
| 2008/0212537 A1* | 9/2008 | Bukai | 370/332 |
| 2009/0257361 A1* | 10/2009 | Deshpande et al. | 370/252 |
| 2010/0165857 A1* | 7/2010 | Meylan et al. | 370/252 |

FOREIGN PATENT DOCUMENTS

| | | |
|---|---|---|
| JP | 2004-056509 | 2/2004 |
| JP | 2004-297426 | 10/2004 |
| JP | 2005-101930 | 4/2005 |
| JP | 2006-262178 | 9/2006 |
| JP | 2007-27952 | 2/2007 |

OTHER PUBLICATIONS

Office Action for Japanese Patent Application No. 2007-117784, mailed Oct. 18, 2011, 6 pages (including English language translation).

International Search Report for PCT/JP2008/058049, mailed Aug. 2008, 5 pages.

* cited by examiner

FIG. 6

| APPLICATION | Packet Info Seq | L2 Info RSSI | L2 Info CIR | L2 Info TxPower |
|---|---|---|---|---|
| G729 | 100 | −78 | 3.2 | 5.3 |
| | 101 | −79 | 4.1 | 6.1 |
| | 102 | −80 | 3.6 | 7.6 |
| | 103 | −76 | 5.8 | 4.6 |
| | 104 | −81 | 2.9 | 7.8 |
| | ⋮ | ⋮ | ⋮ | ⋮ |

FIG. 7

| APPLICATION =G729 | QUALITY = DETERIORATED | SEQUENCE NUMBER = 104 |
|---|---|---|

COMMUNICATION SYSTEM, RADIO
COMMUNICATION DEVICE, AND RADIO
COMMUNICATION METHOD

CROSS-REFERENCE TO RELATED APPLICATIONS

This application is a U.S. National Phase Application of International Patent Application No. PCT/JP2008/058049 filed Apr. 25, 2008, which claims priority to Japanese Patent Application No. 2007-117784 filed Apr. 26, 2007, the disclosures of which are incorporated herein by reference in their entirety.

TECHNICAL FIELD

The present invention relates to a communication system, a radio communication device, and a radio communication method for executing handover according to a communication quality of an application.

BACKGROUND ART

Along with the recent spread of radio communication technologies, an environment is being established in which multiple radio communication systems of different communication schemes can be utilized at the same time. For example, consideration has been made to provide a radio communication device which is connectable to both of a system of cdma2000 n x evolution-data only (EV-DO) which is one of the third generation mobile telecommunication systems, and a wireless LAN system which is defined by IEEE802.11 or the like.

Such a radio communication device connectable to multiple radio communication systems monitors communication quality such as a condition of a radio signal (for example, RSSI) received from a radio base station in connection, throughput or the like. Thereby, the radio communication device can execute handover to a radio base station in another radio communication system before ongoing communication is cut by deterioration of the communication quality (for example, Patent Document 1).

Patent Document 1: JP-A 2004-561996 (pages 11 and 12, FIG. 5)

DISCLOSURE OF THE INVENTION

However, the above-described conventional radio communication device has the following problem. To be precise, the radio communication device uses multiple applications of w real-time based applications such as a voice call utilizing VoIP and of non-real-time based applications such as browsing of web sites. The real-time based applications and the non-real-time based applications have different thresholds of the communication quality, at which handover to another communication system is required.

In addition, the radio communication device connectable to multiple radio communication systems uses different values for the respective radio communication systems, as a value indicting the condition of a radio signal (radio condition information) such as RSSI, and being to be compared with a threshold of the communication quality at which handover is required. Furthermore, applications executed in the radio communication device are changed from one to another by a user of the radio communication device as needed.

In other words, the above-described conventional radio communication device has a problem that handover to another radio communication system cannot be executed at proper timing for each application executed in the radio communication device.

The present invention has been made in view of the foregoing circumstances. Accordingly, an object of the present invention is to provide a communication system, a radio communication device, and a radio communication method which enables execution of handover at proper timing for each application when a communication quality is deteriorated.

The present invention has the following characteristics to solve the problems described above. First of all, a first characteristic of the present invention is summarized in that a communication system includes: a first communication device (communication target device 200) which executes a predetermined application (for example, VoIP); and a second communication device (radio terminal 100) configured to execute an application and to execute a communication with the first communication device through a radio base station (radio base station 11). The first communication device includes: a communication quality monitoring unit (communication quality monitoring unit 205) configured to monitor whether a communication quality of the application (for example, number of packet losses) is deteriorated; and a notification transmitter (communication unit 201) configured to transmit a communication quality deterioration notification (packet P1) to the second communication device when the communication quality monitoring unit monitors that the communication quality is deteriorated, the communication quality deterioration notification indicating that the communication quality is deteriorated. The second communication device includes: a radio condition information acquisition unit (radio condition information acquisition unit 105) configured to acquire radio condition information (for example, RSSI) indicating a condition of a radio signal (radio signal RS) which is transmitted to or received from the radio base station; a notification receiver (EVDO communication unit 101 and WLAN communication unit 103) configured to receive the communication quality deterioration notification from the first communication device; a storage processor (handover controller 107 and a storage unit 111) configured to store a handover threshold (handover threshold TH) in association with the application when the notification receiver receives the communication quality deterioration notification, the handover threshold based on the radio condition information corresponding to the received communication quality deterioration notification; and a handover execution unit (handover controller 107) configured to execute a handover to another radio base station (radio base station 21) on the basis of the radio condition information acquired by the radio condition information acquisition unit and of the handover threshold stored in the storage processor.

A second characteristic of the present invention is summarized as a radio communication device (radio terminal 100) which executes a predetermined application and executes a communication with a communication target device through a radio base station. The radio communication device includes: a radio condition information acquisition unit configured to acquire radio condition information indicating a condition of a radio signal which is transmitted to or received from the radio base station; a notification receiver configured to receive a communication quality deterioration notification from the communication target device, the communication quality deterioration notification indicating that a communication quality of the application is deteriorated in the communication target device; a storage processor configured to store a handover threshold in association with the application when the notification receiver receives the communication quality deterioration notification, the handover threshold based on the radio condition information corresponding to the received communication quality deterioration notification; and a handover execution unit configured to execute a handover to another radio base station on the basis of the radio condition information acquired by the radio condition information acquisition unit and of the handover threshold stored in the storage processor.

In such a radio communication device, the handover threshold is stored in association with the application, the handover threshold based on the radio condition information at the time point when the communication quality deterioration notification is received. Here, the communication quality deterioration notification indicates that the communication quality of the application is deteriorated in the communication target device. Furthermore, handover to another radio base station is executed on the basis of the radio condition information acquired by the radio condition information acquisition unit and of the handover threshold stored in the storage processor.

For this reason, the radio communication device can execute handover to another radio base station at proper timing in accordance with the application which is being executed.

A third characteristic of the present invention is according to the second characteristic of the present invention, and is summarized in that the handover execution unit executes the handover when the handover execution unit determines that the communication quality is deteriorated on the basis of the radio condition information acquired by the radio condition information acquisition unit and of the handover threshold.

A fourth characteristic of the present invention is according to the second characteristic of the present invention, and is summarized in that the radio communication device is connectable to a plurality of radio communication systems (radio communication system 10 and radio communication system 20) of different communication schemes, and the handover execution unit executes a handover to another radio communication system on the basis of the radio condition information acquired by the radio condition information acquisition unit and of the handover threshold.

A fifth characteristic of the present invention is according to the second characteristic of the present invention, and is summarized in that the notification receiver receives the communication quality deterioration notification from the communication target device, the communication quality deterioration notification containing an identifier (sequence number) identifying data outputted by the application, the storage processor stores the radio condition information acquired by the radio condition information acquisition unit in association with the identifier over a predetermined period, and the storage so processor specifies the handover threshold on the basis of the radio condition information and of the identifier contained in the communication quality deterioration notification.

A sixth characteristic of the present invention is according to the second characteristic of the present invention, and is summarized in that the storage processor determines the handover threshold by using a plurality of pieces of the radio condition information.

A seventh characteristic of the present invention is according to the second characteristic of the present invention, and is summarized as further comprising a communication quality determination unit (handover controller 107 and packet information/communication quality acquisition unit 109A) configured to determine whether a receiver side communication quality is deteriorated, the receiver side communication quality being the communication quality of the application executed in the radio communication device. When the communication quality determination unit determines that the receiver side communication quality is deteriorated, the storage processor stores the radio condition information as the handover threshold in association with the application, the radio condition information corresponding to a time point when the receiver side communication quality is determined as deteriorated.

A eighth characteristic of the present invention is summarized as a radio communication method for executing a predetermined application and executing a communication with a communication target device through a radio base station. The radio communication method includes the steps of: acquiring radio condition information indicating a condition of a radio signal which is transmitted to or received from the radio base station; receiving a communication quality deterioration notification from the communication target device, the communication quality deterioration notification indicating that a communication quality of the application is deteriorated in the communication target device; when the communication quality deterioration notification is received, storing a handover threshold in a storage unit in association with the application, the handover threshold based on the radio condition information corresponding to the received communication quality deterioration notification; and executing a handover to another radio base station on the basis of the acquired radio condition information and of the handover threshold stored in the storage unit.

The features of the present invention can provide a communication system, a radio communication device, and a radio communication method which enables execution of handover at proper timing for each application when a communication quality is deteriorated.

BRIEF DESCRIPTION OF THE DRAWINGS

FIG. 6 is a view showing an example of a radio condition information table TB according to the embodiment of the present invention.

FIG. 7 is a view showing an example of a packet containing the communication quality deterioration notification according to the embodiment of the present invention.

BEST MODES FOR CARRYING OUT THE INVENTION

Figure 1:
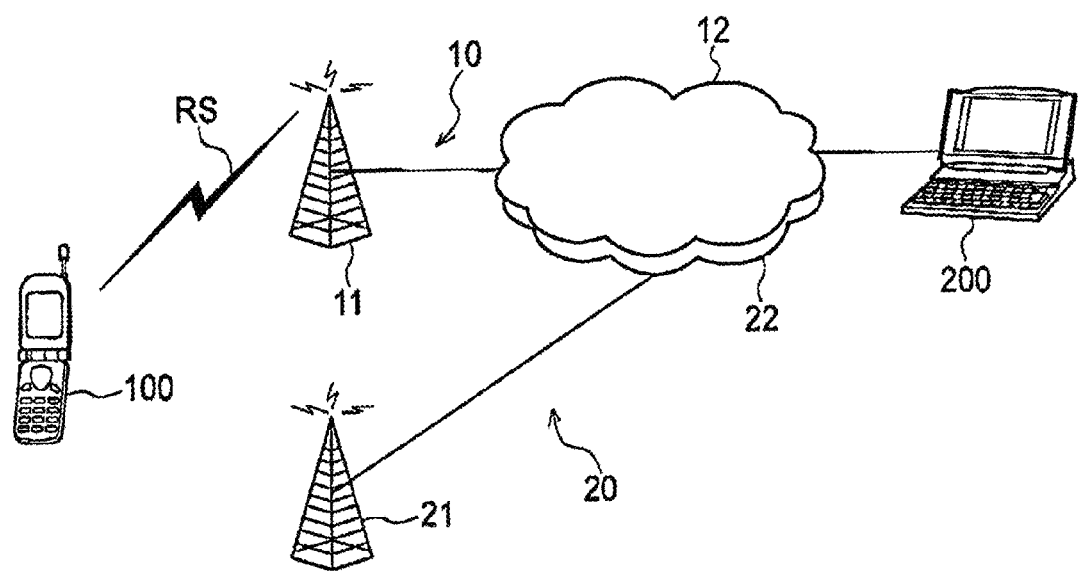
FIG. 1 is an overall schematic configuration diagram of a communication network including a communication system according to an embodiment of the present invention.

Next, an embodiment of the present invention is described. Specifically, the description is given in the following order: (1) an overall schematic configuration of a communication network including a communication system, (2) a functional block configuration of a radio communication device, (3) a functional ao block configuration of a communication target device, (4) an operation of the communication system, (5) effects and advantages, and (6) other embodiments.

In the following description of the drawings, same or similar portions are denoted with same or similar reference numerals. However, it should be noted that the drawings are schematic and ratios of dimensions and the like are different from actual ones.

Therefore, specific dimensions and the like should be determined by taking into consideration the following description. Moreover, as a matter of course, also among the drawings, there are included portions in which dimensional relationships and ratios are different from each other.

(1) Overall Schematic Configuration of Communication Network Including Communication System FIG. 1 is an overall schematic configuration diagram of a communication network including a communication system according to an embodiment of the invention. The communication system according the present embodiment is configured of a radio terminal 100 and a communication target device 200.

The radio terminal 100 is a small-sized radio communication device which can be carried by a user. In the following description, the radio terminal 100 is expressed by MN 100 (Mobile Node) as needed. The radio terminal 100 executes a predetermined application, in this embodiment, a voice call application utilizing VoIP. The radio terminal 100 executes a communication, specifically a voice call application, with the communication target device 200 through a radio base station 11 or a radio base station 21.

The communication target device 200, similarly to the radio terminal 100, executes a voice call application utilizing VoIP. In the following description, the communication target device 200 is expressed by CN 200 (Corresponding Node) as needed.

In the present embodiment, the MN 100 can be connected to multiple radio communication systems. Specifically, the MN 100 can be connected to a radio communication system 10 and a radio communication system 20.

The radio communication system 10 includes the radio base station 11 and a backbone network 12. The radio communication system 10 complies with cdma2000n x evolution-data only (EV-DO) which is one of the third generation mobile telecommunication systems.

The radio communication system 20 includes the radio base station 21 and a backbone network 22. The radio communication system 20 complies with the standards of the wireless LAN system (WLAN), which are defined by IEEE 802.11 or the like.

That is, the MN 100 can be connected to multiple radio communication systems of different communication schemes, specifically, the radio communication system 10 and the radio communication system 20. When the condition of a radio signal RS (for example, RSSI) transmitted from a radio base station (for example, the radio base station 11) configuring the radio communication 10 is deteriorated, the MN 100 can execute handover to the radio base station 21 configuring the radio communication system 20 having a different communication scheme.

In particular, in the present embodiment, the MN 100 receives, from the CN 200, a communication quality deterioration notification indicating that the communication quality of the voice call application is deteriorated in the CN 200, and sets a threshold (handover threshold) used for determining whether to execute handover on the basis of the received communication quality deterioration notification.

(2) Functional Block Configuration of Radio Communication Device

Figure 2:
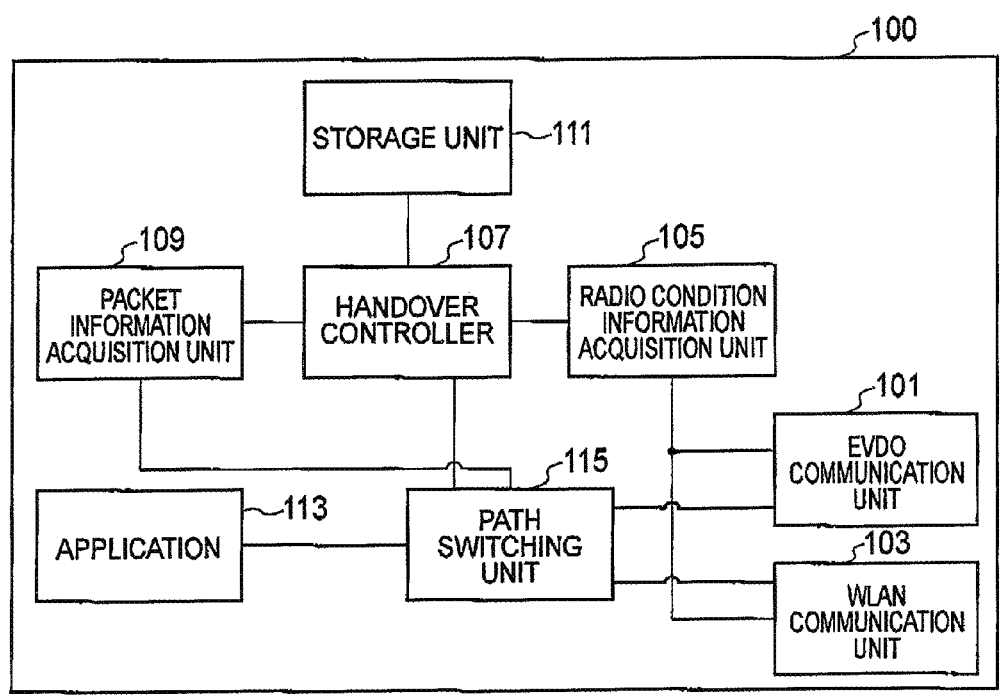
FIG. 2 is a functional block configuration diagram of a radio communication device according to the embodiment of the present invention.

FIG. 2 is a functional block configuration diagram of the MN 100 configuring the radio communication device in the embodiment. As shown in FIG. 2, the MN 100 includes an EVDO communication unit 101, a WLAN communication unit 103, a radio condition information acquisition unit 105, a handover controller 107, a packet information acquisition unit 109, a storage unit 111, an application 113, and a path switching unit 115.

The EVDO communication unit 101 executes radio communication with the radio base station 11 in compliance with EV-DO.

The WLAN communication unit 103 executes a radio communication with the radio base station 21 in compliance with the standards of the wireless LAN system (WLAN) In particular, in the present embodiment, the EVDO communication unit 101 and the WLAN communication unit 103 receive, from the CN 200, a packet P1 (see FIG. 7) containing the communication quality deterioration notification indicating that the communication quality of the voice call application is deteriorated. In the embodiment, the EVDO communication unit 101 and the WLAN communication unit 103 configure a notification receiver.

The radio condition information acquisition unit 105 repeatedly acquires, at every predetermined cycle, radio condition information indicating the condition of radio signals RS transmitted to or received from the radio base station 11 (or the radio base station 21). Specifically, the radio condition information acquisition unit 105 acquires the radio condition information from the EVDO communication unit 101 or the WLAN communication unit 103, and notifies the handover controller 107 of the acquired radio condition information.

As the radio condition information, for example, RSSI, CIR, and transmission power (TxPower) can be used.

When the EVDO communication unit 101 or the WLAN communication unit 103 receives, from the CN 200, the packet P1 (see FIG. 7) containing the communication quality deterioration notification, the handover controller 107 causes a handover threshold TH based on the radio condition information corresponding to the received communication quality deterioration notification to be stored in the storage unit 111 in association with the application. In the present embodiment, the handover controller 107 and the storage unit 111 configure a storage processor.

Specifically, the handover controller 107 causes a radio condition information table TB shown in FIG. 6 to be stored in the storage unit 111. As shown in FIG. 6, the application type (G729) is associated with the radio condition information (RSSI, CIR, TxPower) in the radio condition information table TB. Note that the application type "G729" is a voice call application, and shows that a voice codec to be used complies with the ITU-T recommendations G.729.

In addition, the handover controller 107 sets a handover threshold TH on the basis of the radio condition information corresponding to the communication quality deterioration notification out of the multiple pieces of radio condition information contained in the radio condition information table TB. Note that the specific method of setting the handover threshold TH is described later.

Furthermore, in the embodiment, the handover controller 107 causes the radio condition information to be stored in the storage Unit 111 in association with a sequence number (identifier) of a packet containing data which is outputted by the application 113 when the radio condition information is acquired.

In addition, the handover controller 107 stores the multiple pieces of radio condition information over a predetermined period (for example, for 30 seconds). The radio condition information table TB contains the multiple pieces of radio condition information in the order from the oldest one as is clear from the sequence number of each of the packets (Packet Info Seq in the figure).

In the present embodiment, the handover controller 107 specifies the handover threshold based on the radio condition information contained in the radio condition information table TB and the sequence number included in the communication quality deterioration notification.

For example, the handover controller 107 can set the radio condition information (for example, RSSI=−81 dBm) associated with 104 of "Packet Info Seq" in the radio condition information table TB as a handover threshold when the communication quality deterioration notification, specifically the sequence number contained in the packet P1 received from the CN 200, is "104" (see FIG. 7). In other words, the handover controller 107 can set the radio condition information acquired when the packet having the sequence number of "104" is transmitted to the CN 200 as a handover threshold.

Note that the handover controller 107 can also set the handover threshold TH while including the multiple pieces of radio condition information associated with the packets transmitted to the CN 200 before or after the packet having the sequence number of 104 (for example, the radio condition information having the Packet Info Seq of 103).

Also, the handover controller 107 executes handover to another radio base station (for example, the radio base station 21) on the basis of the radio condition information acquired by the radio condition information acquisition unit 105 and the handover threshold TH stored in the storage unit 111. In the present embodiment, the handover controller 107 configures a handover execution unit.

Specifically, the handover controller 107 determines whether the radio condition information repeatedly acquired at a predetermined cycle satisfies a handover condition defined by the set handover threshold TH. The handover controller 107 notifies the path switching unit 115 of a path switching instruction when the handover condition is satisfied.

In other words, the handover controller 107 executes handover on the basis of the radio condition information and the handover threshold TH when it is determined that the communication quality of the voice call application is deteriorated in the CN 200.

The packet information acquisition unit 109 acquires information on a packet which is transmitted or received through the EVDO communication unit 101 or the WLAN communication unit 103. Specifically, the packet information acquisition unit 109 acquires a port number and a sequence number of the packet. The packet information acquisition unit 109 notifies the handover controller 107 of the port number and the sequence number of the acquired packet.

The storage unit 111 stores the radio condition information table TB and the like on the basis of control of the handover controller 107.

The application 113 is configured of a predetermined application program and an execution environment (CPU or the like). In the embodiment, the application 113 is a voice call application utilizing VoIP.

The application 113 outputs a RTP packet containing voice data encoded by a voice codec to the path switching unit 115 at a predetermined interval (for example, 20 ms). In addition, the application 113 acquires the RTP packet outputted from the path switching unit 115.

The path switching unit 115 switches to any of the paths of the EVDO communication unit 101 and the MAN communication unit 103, that is, any of the radio communication system 10 and the radio communication system 20, on the basis of the path switching instruction notified from the handover controller 107.

The RTP packet outputted from the application 113 is relayed to the EVDO communication unit 101 or the WLAN communication unit 103 through the path switching unit 115. In addition, the RTP packet received through the EVDO communication unit 101 or the WLAN communication unit 103 is relayed to the application 113 through the path switching unit 115.

Also, the path switching unit 115 can switch to any of the paths of the EVDO communication unit 101 and the WLAN communication unit 103 on the basis of a threshold according to the contents of the application 113 (for example, an average of arrival intervals of the RTP packet in the past 200 ms is to be 1.2 times longer than a normal arrival interval).

(3) Functional Block Configuration of Communication Target Device

Figure 3:
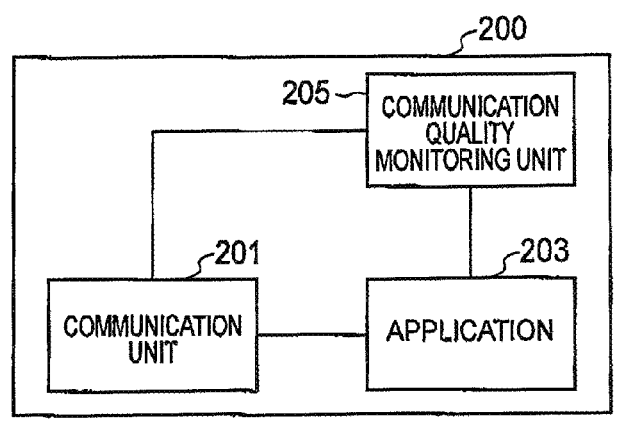
FIG. 3 is a functional block configuration diagram of a communication target device according to the embodiment of the present invention.

FIG. 3 is the functional block configuration diagram of the CN 200. As shown in FIG. 3, the CN 200 includes a communication unit 201, an application 203, and a communication quality monitoring unit 205.

The communication unit 201 is configured of a communication interface (for example, Ethernet (registered trademark)) for making an access to a predetermined access communication network (unillustrated) connected to the backbone network 12 and the backbone network 22.

In particular, in the present embodiment, when a communication quality monitoring unit 205 monitors deterioration of the communication quality of the application 203, the communication unit 201 transmits, to the MN 100, a packet P1 containing a communication quality deterioration notification indicating that a communication quality is deteriorated. In the present embodiment, the communication unit 201 configures a notification transmitter.

Specifically, the communication unit 201 transmits, to the MN 100, the packet P1 containing the following content. That is, the communication unit 201 puts, in the packet P1, the information indicating the application type (application=G729 in the figure) executed in the application 203, the communication quality deterioration notification (quality=deteriorated in the figure), and the sequence number (sequence number=104 in the figure).

Note that in the embodiment, the port number is actually used as the information indicating the application type. In addition, as described above, the sequence number is added to the packet containing the data outputted by the application 113 of the MN 100.

Similar to the application 113 of the MN 100, the application 203 is configured of a predetermined application program (a voice call application) and an execution environment (CPU or the like).

The communication quality monitoring unit 205 is connected to the application 203 through a middleware or the like to monitor whether the communication quality of the application 203 (for example, the number of packet losses) is deteriorated. The communication quality monitoring unit 205 causes the communication unit 201 to transmit the packet P1 when it is detected that the communication quality of the application 203 is deteriorated.

(4) Operation of Communication System

Next, the operations of the above-described communication systems (MN 100 and CN 200) are described.

Figure 4:
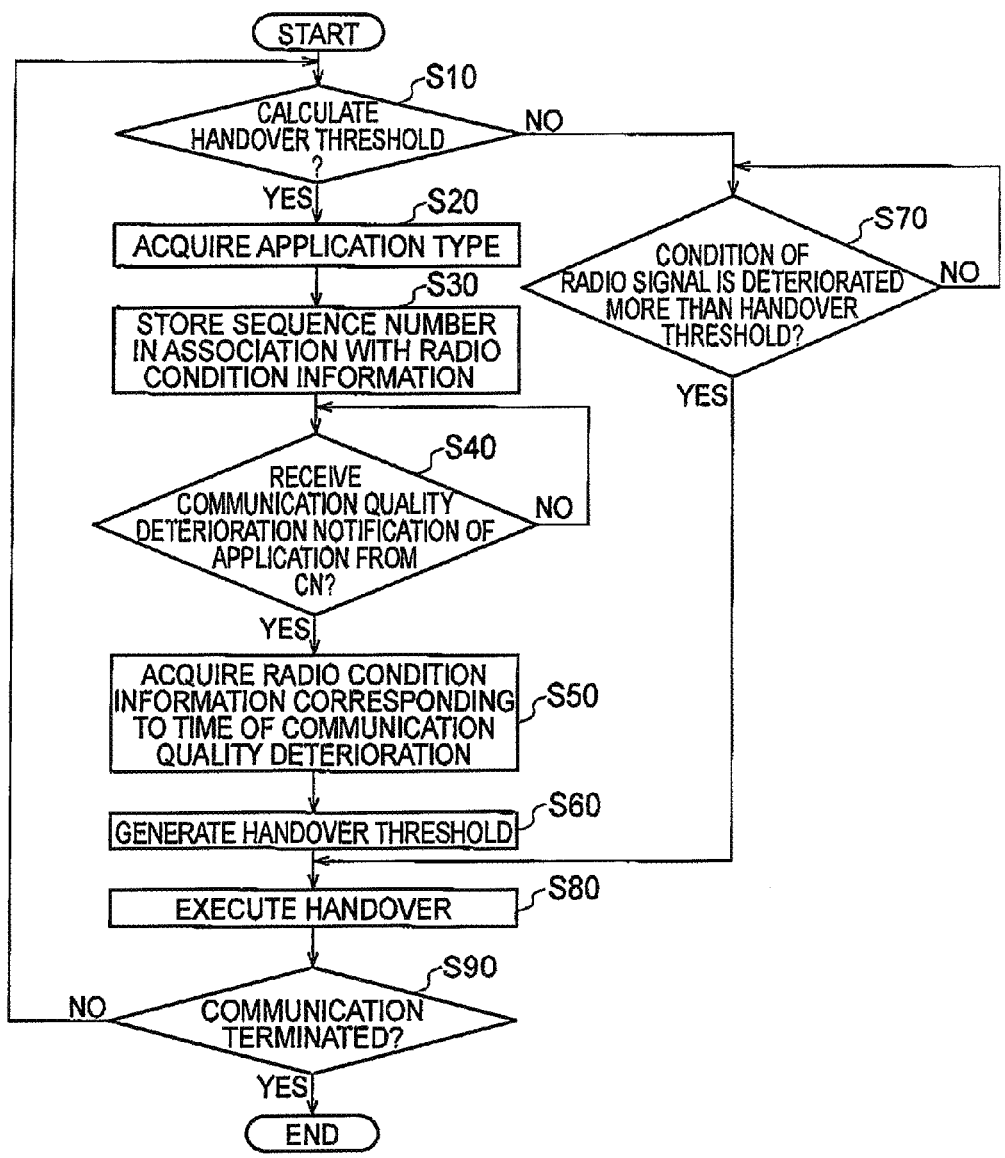
FIG. 4 is a view showing an operation in which the radio communication device according to the embodiment of the present invention executes handover on the basis of a communication quality deterioration notification transmitted from the communication target device.
Figure 5:
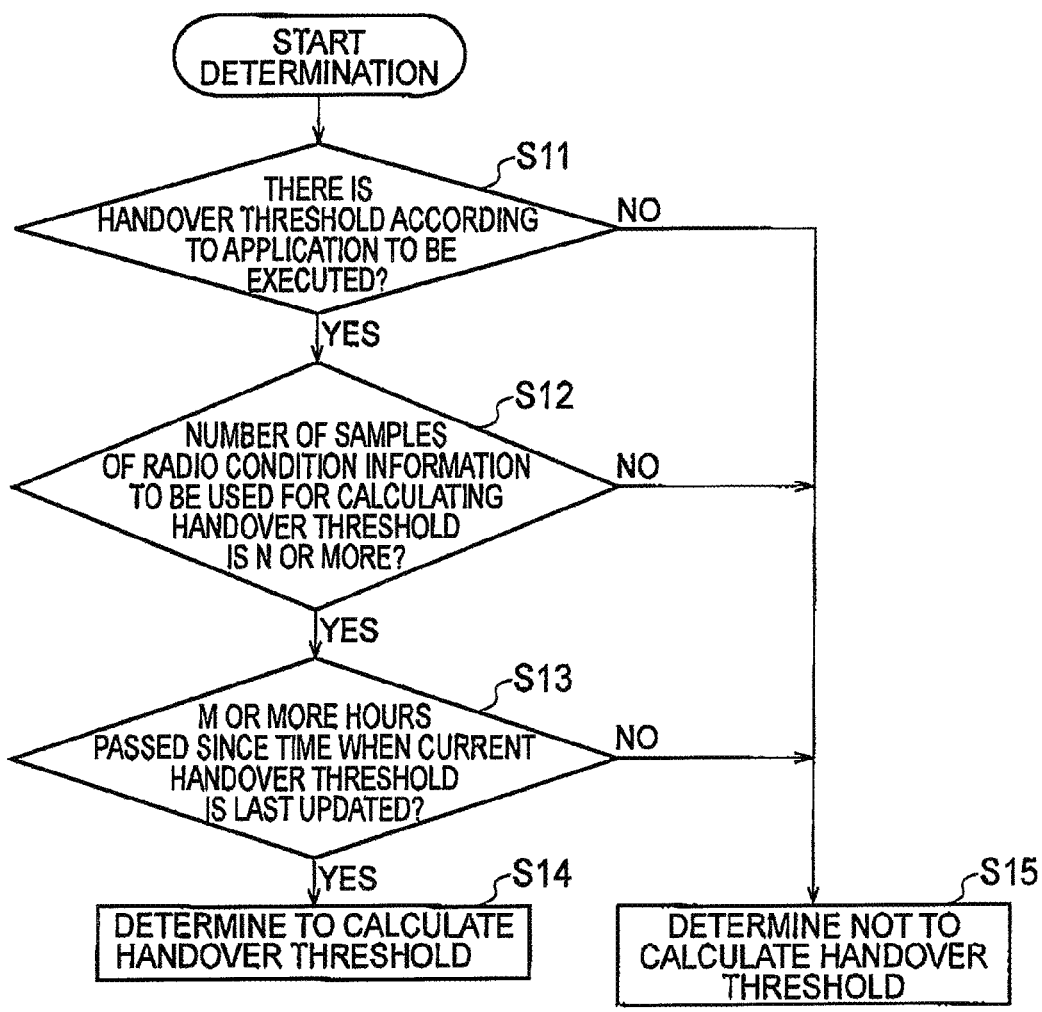
FIG. 5 is a view showing an operation in which the radio communication device according to the embodiment of the present invention executes handover on the basis of a communication quality deterioration notification transmitted from the communication target device.

Specifically, the operation in which the MN 100 executes handover on the basis of a communication quality deterioration notification transmitted from the CN 200 is described by referring to FIG. 4 and FIG. 5.

As shown in FIG. 4, at step S10, the MN 100 determines whether to calculate a handover threshold TH to be used for determining whether to execute handover.

Specifically, the MN 100 determines, according to the flow shown in FIG. 5, whether to generate the handover threshold TH. As shown in FIG. 5, at step S11, the MN 100 determines whether there is a handover threshold TH according to an application to be executed, specifically, to a voice call application.

When there is a handover threshold TH according to the voice call application (YES at step S11), at step S12, the MN 100 determines whether the number of samples of radio condition information to be used for calculating the handover threshold TH is N or more (for example, 10).

When the number of samples of radio condition information to be used for calculating the handover threshold TH is N or more (YES at step S12), at step S13, the MN 100 determines whether M or more hours (for example, 72 hours) have passed since the time when the currently-set handover threshold TH was last updated.

When M or more hours have passed from the latest update time (YES at step S13), at step S14, the MN 100 determines to calculate the handover threshold TH anew.

In contrast, when the determination conditions of steps S11 to S13 are not met, the MN 100 determines not to calculate the handover threshold TH anew.

As shown in FIG. 4, when it is determined that the handover threshold TH is calculated (YES at step S10), at step S20, the so MN 100 acquires an application type which is being executed (for example a voice call application using G.729 for voice codec). Note that the application type can be acquired by referring to a payload type field of an SIP packet or RTP packet, which is used when the communication session starts.

At step S30, the MN 100 stores the sequence number of the packet transmitted to the CN 200 in association with the radio condition information when the packet is transmitted.

At step S40, the MN 100 determines whether the communication quality deterioration notification of the application has been received from the CN 200. As described above, the communication quality deterioration notification is transmitted from the CN 200 to the MN 100 when the communication quality of the application which is being executed is deteriorated in the CN 200.

When the communication quality deterioration notification has been received (YES at step S40), at step S50, the MN 100 acquires the radio condition information corresponding to the communication quality deterioration notification.

At step S60, the MN 100 calculates the handover threshold TH. Specifically, when the number of samples of radio condition information corresponding to the communication quality deterioration notification is N or more, the MN 100 calculates a mean value and variance of each of the pieces of radio condition information (RSSI, CIR, TxPower) contained in the radio condition information table TB (see FIG. 6). Furthermore, the MN 100 uses the mean value of the radio condition information (for example, sa RSSI) having the lowest variance as the handover threshold TH.

Note that the MN 100 may calculate the handover threshold TH by using another value (for example, deviation) indicating statistic of the radio condition information. In addition, the MN 100 can repeatedly calculate the handover threshold TH when the number of samples of radio condition information corresponding to the communication quality deterioration notification is N or more.

When it is determined that the handover threshold TH is not calculated (NO at step S10), at step S70, the MN 100 determines whether the condition of the radio signal RS is deteriorated more than the current handover threshold TH.

When the condition of the radio signal RS is deteriorated more than the current handover threshold TH (YES at step S70), after having calculated the handover threshold TH at step S60, at step S80, the MN 100 executes handover to another radio communication system (for example, the radio communication system 20).

At step S90, the MN 100 determines whether the communication is terminated, that is, whether the voice call using the voice call application is terminated.

When the communication is terminated (YES at step S90), the MN 100 terminates the processing. In contrast, when the communication is not terminated (NO at step S90), the MN 100 repeats the processing from step S10.

Note that at step S13 as described above, when M or more hours (for example, 72 hours) have passed from the latest update time of the handover threshold TH, sampling of the radio condition information is executed for calculating a new handover threshold TH. Here, when the deviation of the radio condition information is 40 to 60 when comparing the statistic of the radio condition information acquired anew by the sampling with the statistic of the radio condition information used for calculating the current handover threshold TH, that is, when the calculated handover threshold TH is determined to be a value having a certain level of reliance as the handover threshold TH, the MN 100 may sequentially increase the number of samples of radio condition information.

In contrast, when the deviation becomes outside the range, the MN 100 may determine that the characteristic of a radio propagation path is varying greatly, and may continue the sampling of the radio condition information. The MN 100 may determine whether to change the current handover threshold TH to a handover threshold TH calculated anew, after continuing the sampling for a predetermined period.

(5) Effects and Advantages

In the radio terminal 100, the handover threshold TH based on the radio condition information corresponding to the communication quality deterioration notification (packet P1) is stored in association with the application which is being executed. Here, the communication quality deterioration notification indicates that the communication quality of the application is deteriorated in the communication target device 200. Furthermore, the handover to another radio base station (for example, the radio base station 21) is executed on the basis of the radio condition information acquired by the radio condition information acquisition unit 105 and the handover threshold TH stored in the storage unit 111.

For this reason, the radio terminal 100 can execute the handover to another radio base station at proper timing according to the application which is being executed. That is, the radio terminal 100 can execute the handover at proper timing for each application when the communication quality of the application is deteriorated.

Also, the radio terminal 100 can autonomously set a proper handover threshold TH according to the condition of the radio communication system (for example, the condition of a radio propagation path or an amount of traffic) by periodically updating the handover threshold TH.

Furthermore, even when the user installs a new application in the radio terminal 100, the radio terminal 100 can have flexibility to be compatible to the unknown application by installing, together with the application, a middleware which can determine deterioration of a communication quality of the application.

In addition, in the present embodiment, the radio condition information at a time of deterioration of the communication quality is specified by using the sequence number (identifier) of the packet containing the data outputted by the radio terminal 100 (application 113) when the radio condition information acquisition unit 105 acquires the radio condition information. Consequently, even when multiple pieces of radio condition information are acquired, the radio condition information at the time of deterioration of the communication quality can be surely determined.

(6) Other Embodiments

As described above, the contents of the present invention have been disclosed using one embodiment of the present invention. However, it should not be understood that the description and drawings which constitute a part of this disclosure limit the invention. From this disclosure, various alternative embodiments will be apparent to a person skilled in the art.

For example, in the above-described embodiment the present invention is applied to the deterioration of the communication quality in an uplink, that is, the direction from the MN 100 to the CN 200. However, the present invention can be also applied to the deterioration of the communication quality in a downlink, that is, the direction from the CN 200 to the MN 100.

Figure 8:
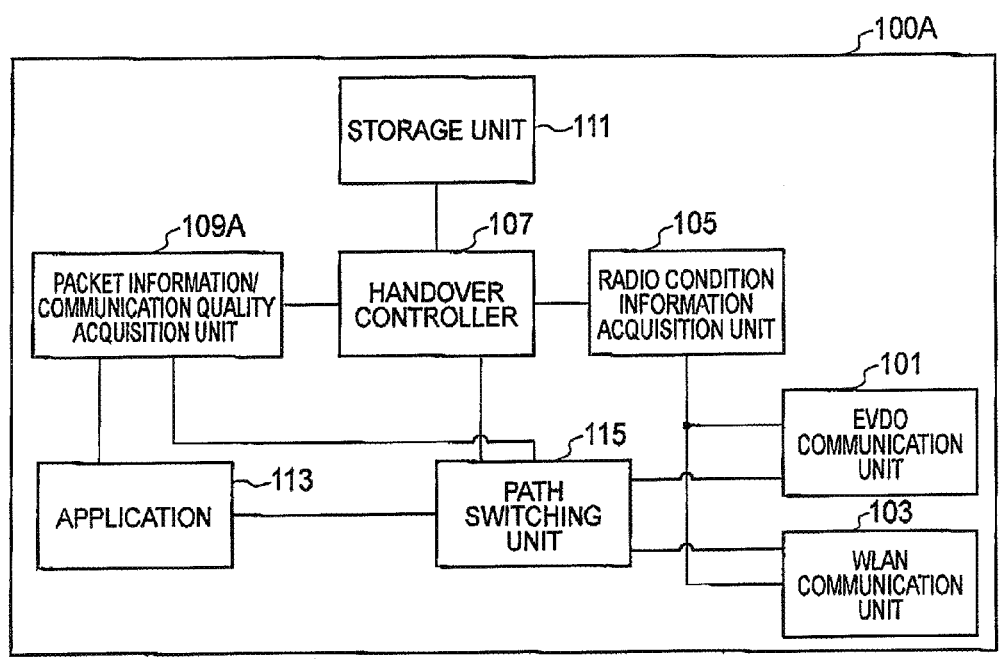
FIG. 8 is a functional block configuration diagram of a radio communication device according to a modified embodiment of the present invention.

FIG. 8 is a functional block configuration diagram of a radio terminal 100A according to a modified embodiment of the present invention. As compared with the radio terminal 100 (MN 100), the radio terminal 100A has a packet information/communication quality acquisition unit 109A in place of the packet information acquisition unit 109.

The packet information/communication quality acquisition unit 109A is connected to an application 113 through a middleware or the like to determine whether a communication quality (receiver side communication quality) of an application which is being executed in the radio terminal 100A is deteriorated. In the present modified embodiment, a handover controller 107 and the packet information/communication quality acquisition unit 109A configure a communication quality determination unit.

Also, in the present modified embodiment, when the packet information/communication quality acquisition unit 109A determines that the receiver side communication quality is deteriorated, the handover controller 107 can store the radio condition information as a handover threshold in association with the application, the radio condition information at the time point when the receiver side communication quality is determined as deteriorated.

As described above, the packet information/communication quality acquisition unit 109A acquires the receiver side communication quality (for example, arrival interval of reception RTP packets) of an application, specifically, a voice call application, which is being executed in the radio terminal 100A. As a result, the deterioration of the communication quality in the direction from the CN 200 to the MN 100 can be determined.

In addition, in the above-described embodiment, the description has been given of the example of handover between radio communication systems of different communication schemes. However, the present invention is not necessarily limitedly applied to the handover between the radio communication systems of different communication schemes.

In the embodiment described above, the radio condition information at the time of the deterioration of the communication quality is specified by using the sequence number of the packet containing the data outputted by the radio terminal 100 (application 113) when the radio condition information acquisition unit 105 acquires the radio condition information. However, the sequence number is not necessarily used. For example, when a communication quality deterioration notification is received, the radio terminal 100 may associate the latest radio condition information with the communication quality deterioration notification, or may associate the radio condition information acquired before a predetermined number of samples with the communication quality deterioration notification.

Also, the functions to monitor and notify the communication quality of an application may be provided on a node (for example, a server or a radio base station) on the communication network, instead of a device executing the application (a voice call application) such as the communication target device 200.

As described above, the present invention naturally includes various embodiments which are not described herein. Accordingly, the technical scope of the present invention is only defined from the features the invention according to the scope of claims which are appropriate from the description above.

Note that the entire content of Japanese Patent Application 2007-117784 (filed on Apr. 26, 2007) is incorporated herein by reference.

INDUSTRIAL APPLICABILITY

As described above, the communication system, the radio communication device, and the radio communication method according to the present invention can execute handover at proper timing for each application when a communication quality is deteriorated, and, thus, are useful for radio communications such as mobile communications.

The invention claimed is:
1. A communication system, comprising:
a first communication device; and
a second communication device configured to execute an application from among two or more applications and to execute a communication with the first communication device through a base station, wherein the first communication device includes:
a communication quality monitoring unit configured to monitor whether a communication quality of the application is deteriorated; and
a notification transmitter configured to transmit a communication quality deterioration notification to the second communication device when the communication quality monitoring unit monitors that the communication quality is deteriorated, the communication quality deterioration notification indicating that the communication quality is deteriorated, and the second communication device includes:
a condition information acquisition unit configured to acquire condition information indicating a condition of a signal which is transmitted to or received from the base station;
a notification receiver configured to receive the communication quality deterioration notification from the first communication device; and
a handover control unit configured to set a handover threshold corresponding to the application currently being executed, the handover threshold being set based on the condition information specified by the received communication quality deterioration notification when the notification receiver receives the communication quality deterioration notification, wherein the handover threshold corresponding to the application currently being executed is chosen from two or more handover thresholds corresponding to each of two or more applications, respectively, executed wherein the notification receiver receives the communication quality deterioration notification from the first communication device, the communication quality deterioration notification containing an identifier identifying data outputted by the application, the handover control unit stores the condition information acquired by the condition information acquisition unit in association with the identifier over a predetermined period, and the handover control unit specifies the handover threshold on the basis of the condition information and of the identifier contained in the communication quality deterioration notification.

2. A communication device which executes an application from among two or more applications and executes a communication with a communication target device through a base station, the communication device comprising:
a condition information acquisition unit configured to acquire condition information indicating a condition of a signal which is transmitted to or received from the base station;
a notification receiver configured to receive a communication quality deterioration notification from the communication target device, the communication quality deterioration notification indicating that a communication quality of the application is deteriorated in the communication target device; and
a handover control unit configured to set the condition information specified by the received communication quality deterioration notification as a handover threshold corresponding to the application currently being executed when the notification receiver receives the communication quality deterioration notification, wherein the handover threshold corresponding to the application currently being executed is chosen from two or more handover thresholds corresponding to each of two or more applications, respectively, wherein the notification receiver receives the communication quality deterioration notification from the communication target device, the communication quality deterioration notification containing an identifier identifying data outputted by the application, the handover control unit stores the condition information acquired by the condition information acquisition unit in association with the identifier over a predetermined period, and the handover control unit specifies the handover threshold on the basis of the condition information and of the identifier contained in the communication quality deterioration notification.

3. The communication device according to claim 2, wherein the handover control unit executes a handover when the handover control unit determines that the communication quality is deteriorated on the basis of the condition information acquired by the condition information acquisition unit and of the handover threshold.

4. The communication device according to claim 2, wherein the communication device is connectable to a plurality of communication systems of different communication schemes, and the handover control unit executes a handover to another communication system on the basis of the condition information acquired by the condition information acquisition unit and of the handover threshold.

5. The communication device according to claim 2, wherein the handover control unit determines the handover threshold by using a plurality of pieces of the condition information.

6. The communication device according to claim 2, further comprising a communication quality determination unit configured to determine whether a receiver side communication quality is deteriorated, the receiver side communication quality being the communication quality of the application executed in the communication device, wherein when the communication quality determination unit determines that the receiver side communication quality is deteriorated, the handover control unit stores the condition information as the handover threshold in association with the application, the condition information corresponding to a time point when the receiver side communication quality is determined as deteriorated.

7. The radio communication device according to claim 2, wherein the condition information is obtained when a data corresponding to the received communication quality deterioration notification is transmitted.

8. A communication method for executing an application from among two or more application in a communication device and executing a communication with a communication target device through a base station, the communication method comprising the steps of:
acquiring condition information indicating a condition of a signal which is transmitted to or received from the base station;
receiving a communication quality deterioration notification from the communication target device, the communication quality deterioration notification indicating that a communication quality of the application currently being executed is deteriorated in the communication target device;
when the communication quality deterioration notification is received, setting the condition information specified by the received communication quality deterioration notification as a handover threshold in a handover control unit in the communication device, wherein the handover threshold corresponds to the application currently being executed and is chosen from two or more handover thresholds corresponding to each of two or more applications, respectively, wherein the receiving step receives the communication quality deterioration notification containing an identifier identifying data outputted by the application, the handover control unit stores the condition information acquired by the acquiring step in association with the identifier over a predetermined period, and the handover control unit specifies the handover threshold on the basis of the condition information and of the identifier contained in the communication quality deterioration notification.

* * * * *